United States Patent
Huie

(10) Patent No.: US 12,100,012 B2
(45) Date of Patent: Sep. 24, 2024

(54) PRODUCT REGISTRATION SYSTEM

(71) Applicant: Johnson-Rauhoff, Inc., St. Joseph, MI (US)

(72) Inventor: Mike Huie, St. Joseph, MI (US)

(73) Assignee: Johnson-Rauhoff, Inc., St. Joseph, MI (US)

(*) Notice: Subject to any disclaimer, the term of this patent is extended or adjusted under 35 U.S.C. 154(b) by 267 days.

(21) Appl. No.: 17/317,982

(22) Filed: May 12, 2021

(65) Prior Publication Data

US 2021/0365877 A1 Nov. 25, 2021

Related U.S. Application Data

(60) Provisional application No. 63/028,876, filed on May 22, 2020.

(51) Int. Cl.
*G06Q 30/018* (2023.01)
*G06F 3/16* (2006.01)
(Continued)

(52) U.S. Cl.
CPC ....... *G06Q 30/018* (2013.01); *G06K 7/10861* (2013.01); *G06K 7/1443* (2013.01);
(Continued)

(58) Field of Classification Search
CPC .... G06Q 30/018; G06Q 10/087; G06Q 10/20; G06Q 30/012; G06Q 30/014;
(Continued)

(56) References Cited

U.S. PATENT DOCUMENTS 8,639,036 B1* 1/2014 Singer ................. G06V 30/268
382/141
9,129,276 B1* 9/2015 Fasoli ................. G06Q 20/203
(Continued)

FOREIGN PATENT DOCUMENTS

JP 6548771 A 10/2019
TW 202027015 A 7/2020

OTHER PUBLICATIONS

International Search Report & Written Opinion dated Aug. 16, 2021, Application No. PCT/US21/31899.
(Continued)

*Primary Examiner* — Michael Jared Walker
(74) *Attorney, Agent, or Firm* — The Dobrusin Law Firm, PC

(57) ABSTRACT

A system for capturing a product tag image, extracting product information, and validating information. The extracted information is then utilized to populate a universal (brand independent) product registration database. To incentivize end users to register their new and in service products, entry is simplified by the use of an application on a smartphone, tablet or personal computer. A user downloads an application and enters their information then takes at least one picture/scan/image of the product label(s) that contain: 1) manufacturer name (and/or brand name), 2) model number, 3) serial number; and 4) date of production. Said information is extracted by Optical Character Recognition (OCR) and then validated before entering said database.

5 Claims, 5 Drawing Sheets

(51) Int. Cl.
| | |
|---|---|
| *G06K 7/10* | (2006.01) |
| *G06K 7/14* | (2006.01) |
| *G06Q 10/087* | (2023.01) |
| *G06Q 10/20* | (2023.01) |
| *G06Q 30/012* | (2023.01) |
| *G06Q 30/014* | (2023.01) |
| *G06V 10/94* | (2022.01) |
| *G06V 30/14* | (2022.01) |

(52) U.S. Cl.
CPC ......... *G06Q 10/087* (2013.01); *G06V 10/945* (2022.01); *G06V 30/1452* (2022.01); *G06F 3/16* (2013.01); *G06K 2007/10504* (2013.01); *G06Q 10/20* (2013.01); *G06Q 30/012* (2013.01); *G06Q 30/014* (2013.01)

(58) Field of Classification Search
CPC ............. G06K 7/10861; G06K 7/1443; G06K 2007/10504; G06V 10/945; G06V 30/1452; G06F 3/16; Y02P 90/80
See application file for complete search history.

(56) References Cited

U.S. PATENT DOCUMENTS

| | | | | |
|---|---|---|---|---|
| 10,402,847 | B2* | 9/2019 | Marcus | G06Q 30/0234 |
| 2011/0035301 | A1* | 2/2011 | Small | G06Q 99/00 |
| | | | | 705/28 |
| 2012/0169856 | A1* | 7/2012 | Ahmed | G06Q 10/08 |
| | | | | 348/61 |
| 2012/0179727 | A1* | 7/2012 | Esser | G09B 29/106 |
| | | | | 707/802 |
| 2013/0117187 | A1* | 5/2013 | Small | G06Q 30/06 |
| | | | | 705/303 |
| 2014/0046760 | A1* | 2/2014 | Keogh | G06Q 30/02 |
| | | | | 705/14.53 |
| 2014/0156769 | A1* | 6/2014 | Wan | H04L 51/52 |
| | | | | 709/206 |
| 2015/0026074 | A1* | 1/2015 | Cotten | G06Q 30/012 |
| | | | | 705/302 |
| 2016/0092881 | A1* | 3/2016 | Forese | G06Q 30/012 |
| | | | | 705/302 |
| 2017/0083921 | A1* | 3/2017 | Espinoza | G06Q 30/014 |
| 2017/0132656 | A1* | 5/2017 | Marcus | G06Q 30/0234 |
| 2017/0206536 | A1* | 7/2017 | Brelig | G06Q 10/0875 |
| 2018/0033016 | A1* | 2/2018 | Mayman | G06Q 30/012 |
| 2018/0307956 | A1* | 10/2018 | Sheth | G06F 40/284 |
| 2018/0322511 | A1* | 11/2018 | Sheth | G06V 30/413 |
| 2019/0015079 | A1 | 1/2019 | Poland | |
| 2021/0019695 | A1* | 1/2021 | Fujisawa | G06Q 30/0641 |
| 2021/0090011 | A1* | 3/2021 | Rae | G06F 16/955 |

OTHER PUBLICATIONS

Krishna Marlapalli et al.: Digital Image Processing Techniques in Character Recognition—A Survey, International Journal of Scientic Research in Computer Science, Engineering and Information Technology, vol. 2, No. 6, Dec. 1, 2017, pp. 95-101.

European Communication & Partial Search Report dated Jun. 21, 2024, Application No. 21809731.9.

* cited by examiner

PRODUCT REGISTRATION SYSTEM

CROSS REFERENCE TO RELATED APPLICATIONS

This application claims priority and benefit to Provisional Patent Application Ser. No. 63/028,876, filed May 22, 2020.

TECHNICAL FIELD

The present invention relates to a system for receiving product information and creating a reference database for recalls and/or registering the product information with the manufacturer.

BACKGROUND

Consumer products are commonly sold with warranties from the manufacturer, as well as other conditions to the sale. In some cases, to obtain the warranty or the full benefits of a product warranty, it is necessary for consumers to register their product after purchase with the manufacturer or third-party entities that periodically check for Consumer Product Safety Commission "CPSC" status.

Product registration also provides many benefits for manufacturers of products by giving them valuable consumer information. For example, once manufacturers know who owns what products they can tailor advertising and/or communications to those consumers for related products or related services or consumable products. Additionally, manufactures are obligated to inform their customers of certain product recalls, which can often be expensive and cumbersome. Increased product registration allows manufacturers to save both time and money in the process of informing customers about these recalls. Additionally, the communication linkage could provide for addressing other potential quality or performance issues.

Currently most manufacturers lack an easy and hassle-free way for consumers to register their purchased products with the manufacturer. Many manufacturers still relay on paper cards or the like to be mailed in by consumers who buy the products. The consumers must fill out the cards and mail them back to the manufacturer in order to register the product. Because of this hassle, most consumers fail to ever register their product. This has created a significant volume of older products that are in service but not registered. It is believed that up to 90% of products are not registered leaving customers vulnerable to missed recall and/or maintenance information.

Other manufacturers have created alternative means for consumers to register their products. For example, some manufacturers have created websites where consumers can register their products. However, this can be tedious for consumers to have more than one place to go to register different products, and websites between different manufacturers lack consistency as to what type of information must be entered. Further, consumers lack a single place to go to that provides them with all of their various product's registration information.

Accordingly, an improved method and system for registering products with product manufacturers is needed. There exists a need in the art to provide a centralized and universal registration process regardless of manufacturer or product or even changes over time for a given manufacturer or brand.

SUMMARY

A method of populating a consumer product database based on information from a product label on a consumer product, the method having the steps of capturing an image of the product label using a camera, obtaining a set of predetermined information from the product label of the consumer product, the predetermined information including the 1) manufacturer name, 2) model number, and 3) serial number and/or production date, the predetermined information obtained by means of image recognition from the product label image, validating the predetermined information obtained using image recognition, validating the predetermined information by comparing the predetermined information to preexisting databases, and storing the predetermined information in the consumer product database.

A method of populating a consumer product database based on information from a product label on a consumer product, the method having the steps of capturing an image of the product label using a camera, obtaining a set of predetermined information from the product label of the consumer product, the predetermined information including the 1) manufacturer name, 2) model number, and 3) serial number and/or production date, the predetermined information obtained by means of image recognition from the product label image, validating the predetermined information obtained using image recognition, validating the predetermined information by comparing the predetermined information to preexisting databases, and storing the predetermined information in the consumer product database. In some embodiments, capturing the image of the product label further includes the step of automatically setting grid lines to highlight areas of interest and reduce raw text. In other embodiments, capturing the image of the product label further includes the step of setting the color contrast ratio for a computation of the difference in luminance between two neighboring colors when shown on a display. In some embodiments, capturing the image of the product label further includes the step of removing gestures. Capturing the image of the product label may further include the step of automatically focusing on the product label. In some embodiments, a plurality of images are taken. In some embodiments, validating the brand name of the predetermined information is by means of comparing to previously validated scanned labels and/or in other embodiments validating the brand name of the predetermined information is by means of searching a database and comparing to information in said database to the brand name determined by said optical character recognition. In some embodiments, validating the model number of the predetermined information comprises the step of utilizing a character string indicative of a model number and/or in other embodiments validating the serial number of the predetermined information comprises the step of utilizing a character string indicative of a serial number. In some embodiments, validating the serial number of the predetermined information is by means of searching a database and comparing to information in said database to the serial number name determined by said optical character recognition. In other embodiments validating the production date of the predetermined information comprises the step of utilizing a character string indicative of a production date. In some embodiments, validating the serial number of the predetermined information is by means of searching a database and comparing to information in said database to the serial number string determined by said optical character recognition. In other embodiments, the step of displaying on a display screen the predetermined information to the user for confirmation of accuracy, receiving input from the user regarding said accuracy of the predetermined information is made. In other embodiments, the method further includes the step of audibly projecting through a speaker the predetermined information to the user for confirmation of accuracy, receiving input from the user regarding said accuracy of the predetermined information. The method further includes the step of displaying predetermined information for human review of images and manual searching regarding said accuracy of the predetermined information and updating of template masks for known manufacturers and constructing grids for previously unknown manufacturers.

In other embodiments, a method of populating a consumer product database based on information from a product label on a consumer product is provided having the steps of receiving through an audio receiver a set of predetermined information from the product label of the consumer product by means of the user reading and providing an audio input of the product label information, the predetermined information including the 1) manufacturer name, 2) model number, and 3) serial number and/or production date, audibly projecting the predetermined information back to the user for confirmation of accuracy, and receiving input from the user regarding said accuracy of the predetermined information. The method may further include the step of visibly providing the predetermined information to the user for confirmation of accuracy, receiving input from the user regarding said accuracy of the predetermined information.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized, and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A system for capturing a product tag image, extracting product information, and validating information is provided herein. The extracted information is then utilized to populate a product registration database. To incentivize end users to register their products, entry is simplified by the use of an application on a smartphone, tablet or personal computer. A user downloads an application and enters their information then takes at least one picture/scan/image of the product label(s) that contain: 1) brand name (and/or manufacturer name), 2) model number, 3) serial number and/or date of production. It should be appreciated that the terms "brand" and "manufacturer" name may be used interchangeably and are defined as the company name or consumer facing product brand, manufacturer, company name, original equipment manufacturer, owner . . . etc. associated with the product. It should be appreciated that the terms "brand" and "manufacturer" name may be used interchangeably and are defined as the company name or consumer facing product brand, manufacturer, company name, original equipment manufacturer, owner . . . etc. associated with the product. Said information is typically determined via extraction by image recognition, such as Optical Character Recognition, and then validated before entering said database. It should be appreciated that "image recognition" means any suitable form of image or character recognition, including, but not limited to Optical Character Recognition (OCR), computer vision, video recognition . . . etc. all using the camera or video recorder available on a mobile device or other computer. It is also possible through image recognition that the product label image be utilized as a product fingerprint of the product. This product fingerprint can then be identified via optical comparison with images provided in a manufacturers database to couple the product owner with the brand or manufacturing entity having the corresponding 1) brand name, 2) model number, 3) serial number and/or date or production on record and linked to the fingerprint image.

Figure 1:
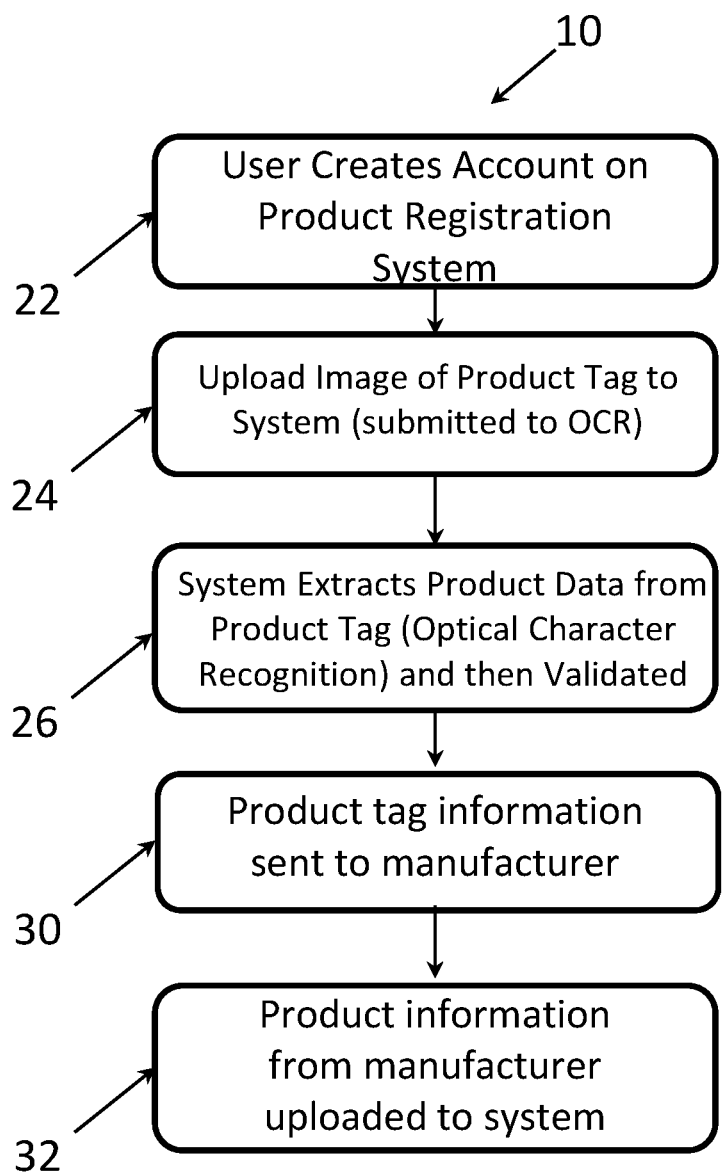
FIG. 1 illustrates a flow chart for a product registration system according to one or more embodiments shown and described herein.

A system 10 for registering consumer products is generally presented and described at a high level in FIG. 1. The product registration system 10 may be configured to receive consumer product information and provide the relevant product information to the product manufacturer.

The product registration system 10 may be implemented on a mobile device, such as through a software application that is designed to run on the mobile device. As used herein, a mobile device may comprise any device that includes a camera, a network or internet connection, and is capable of running a software application, such as a mobile phone, tablet, or other computing device.

With reference to FIG. 1, a flowchart of the product registration process 10 is illustrated. In a first step 22 a user is prompted to create an account. The account may include biographical data of the user such as name, address, and the like. The account may further include a unique username and password to allow the user to login to the product registration system 10. The product registration system 10 may be configured to associate records and other data with the account, both as uploaded by the user and as provided by manufacturers, as provided in further detail below.

Figure 2:
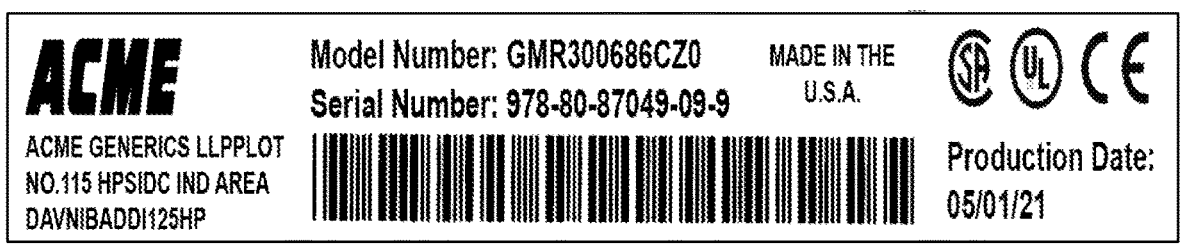
FIG. 2 illustrates an example of a product tag to be photographed using the high-quality image capture process according to one or more embodiments shown and described herein.

In a second step 24 (of FIG. 1), a user may capture an image of a product tag 40 using a camera on a mobile device that is running the product registration system application. A traditional product tag 40 is illustrated in FIG. 2. The product tag 40 may include various pieces of information related to the product, such as product names, product numbers, model numbers, serial numbers, barcodes, UL listing information, and the like. The user may capture an image of the product tag 40 and may upload the image into the product registration system. Furthermore, pre-scanning may also be utilized. Pre-scanning of labels to ensure High Quality Image Capture Process, i.e., the camera is set for autofocus. Additionally, the scanned image is then adjusted using known tools for brightness and contrast enhancement for readability. A grid template/mask can be used to eliminate areas of non interest in the image.

Figure 3:
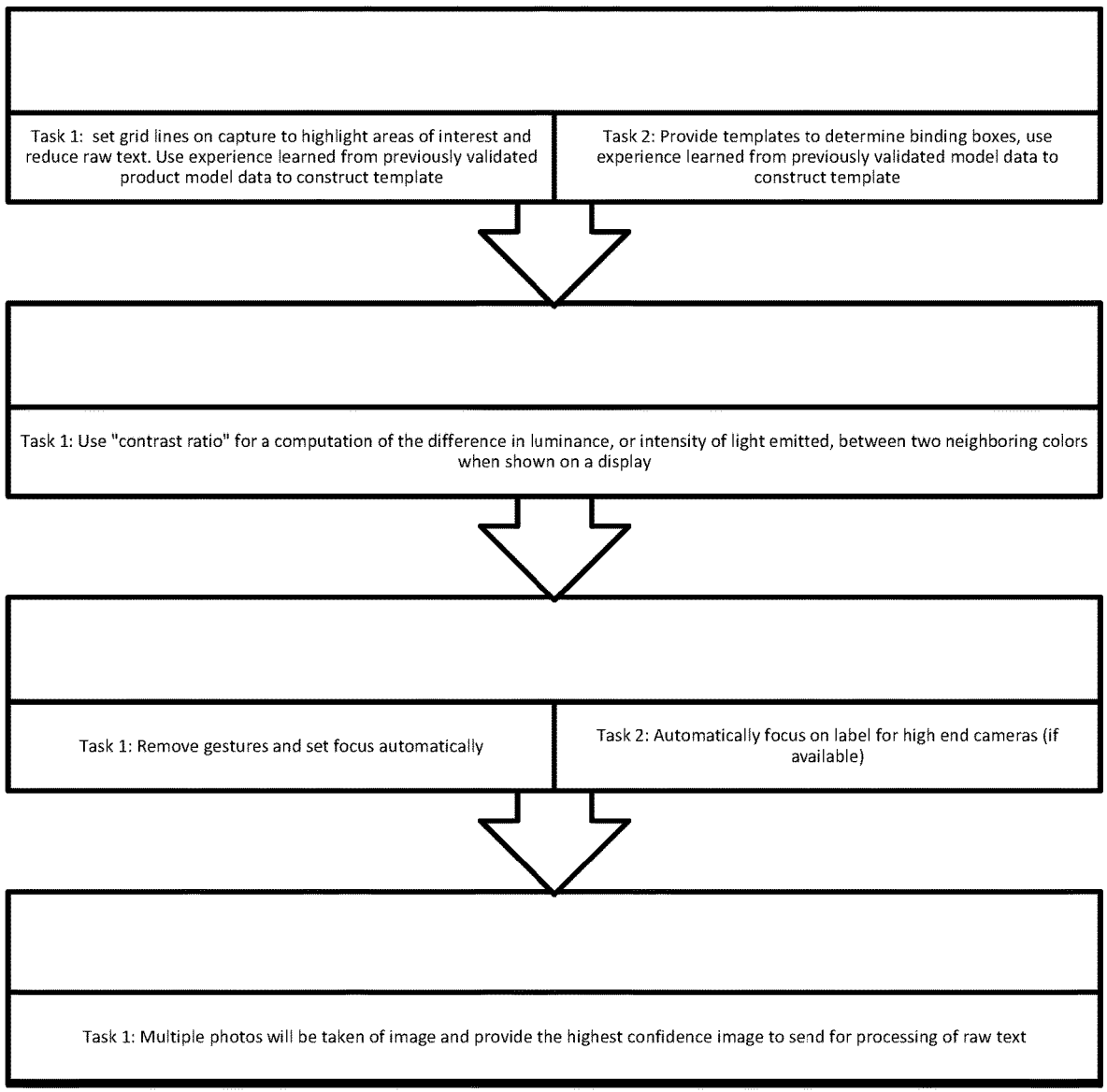
FIG. 3 illustrates a flow chart of the high-quality image capture process used to capture an image of a label on a product according to one or more embodiments shown and described herein.

The high-quality image capture process is illustrated in FIG. 3. The high-quality image capture process generally includes the steps of automatically setting grid lines, setting color contrast, setting focus assist and collecting multiple images for submission to OCR. Automatically setting the grid lines includes the steps of 1) setting grid lines on capture to highlight areas of interest and reduce raw text oftentimes using experience learned from previously validated product model number data to construct a template; and 2) providing templates to determine binding boxes, use experience learned from previously validated model number data to construct template (flagging a box for expected content). Setting the color contrast is then performed wherein a "contrast ratio" is used for a computation of the difference in luminance, or intensity of light emitted, between two neighboring colors when shown on a display. Focus assist includes the sub-steps of 1) removing gestures and set focus automatically; and 2) automatically focusing on the label for high end cameras (if available). Lastly, multiple images are captured and submitted to OCR. Multiple photos will be taken of image and provide the highest confidence image to send for processing of raw text. In some embodiments, the user of the app (or other software) may be queried to select the best image or queried to provide brand and/or product type.

In a third step 26, the product registration system 10 may extract product information from the product tag 40. The image is uploaded to a cloud server that provides Optical Character Recognition (OCR) such as Amazon Web services' (Textract or Rekognition). The OCR utility identifies and records text images and then provides a machine readable text record for the given uploaded image. For example, the system may use any known methods to scan the image data and identify predetermined figures, data, or codes that may be used to identify the product related to the product tag. The known methods may include any type of scanning, barcode scanning, character matching, image recognition and/or optical character recognition ("OCR"). The scanning process may extract any data that is relevant to determining identification of the product, including manufacturer names, brand names, model numbers, serial numbers, product IDs, UL codes, and other identifying information.

In an embodiment, the scanning process may be configured to analyze the product tag image 40 and determine if the product tag 40 matches a template related to any known product tags. For example, the product recognition system 10 may include and store templates related to known product tags 40. The templates may include information about a tag 40 including the size or shape of the tag 40, the size or font of text on the tag 40, the location of various data, information, or symbols on the tag 40. Or other arrangement or configuration features that are unique to the tag 40. In the third step 26, the product registration system 10 may compare known templates with the uploaded image of the tag 40. If a template match is determined, then the product registration system 10 may move on with the registration sequence. If no match is determined, meaning that the product tag 40 does not match any known product tags within the product registration system 10, then the product tag image may be flagged and sent for review and analysis so that a new template can be created. Once that template is created, the registration process will resume.

In an optional embodiment, the product registration system 10 may use the template match to perform Optical Character Recognition ("OCR") on the product tag. The OCR process may be configured to extract product information from the tag 40 by using OCR to read alphanumeric characters and determine information about the product to be registered. Using the template associated with the tag 40, the product registration system 10 will know where to look to find the relevant data. The extracted data may include the product manufacturer, product name, model number, serial number, and other information that may be relevant to product registration.

It will be appreciated that the steps of template comparison, template creation, and performing OCR may be performed within the software application or may be performed remotely. For example, the software application may be configured to upload the image data of the product tag 40 to a remote database before these processes are performed. The product registration system 10 may access the image data and remotely perform the template and OCR operations described herein. Alternatively, all operations may be performed locally on the mobile device.

Figure 4:
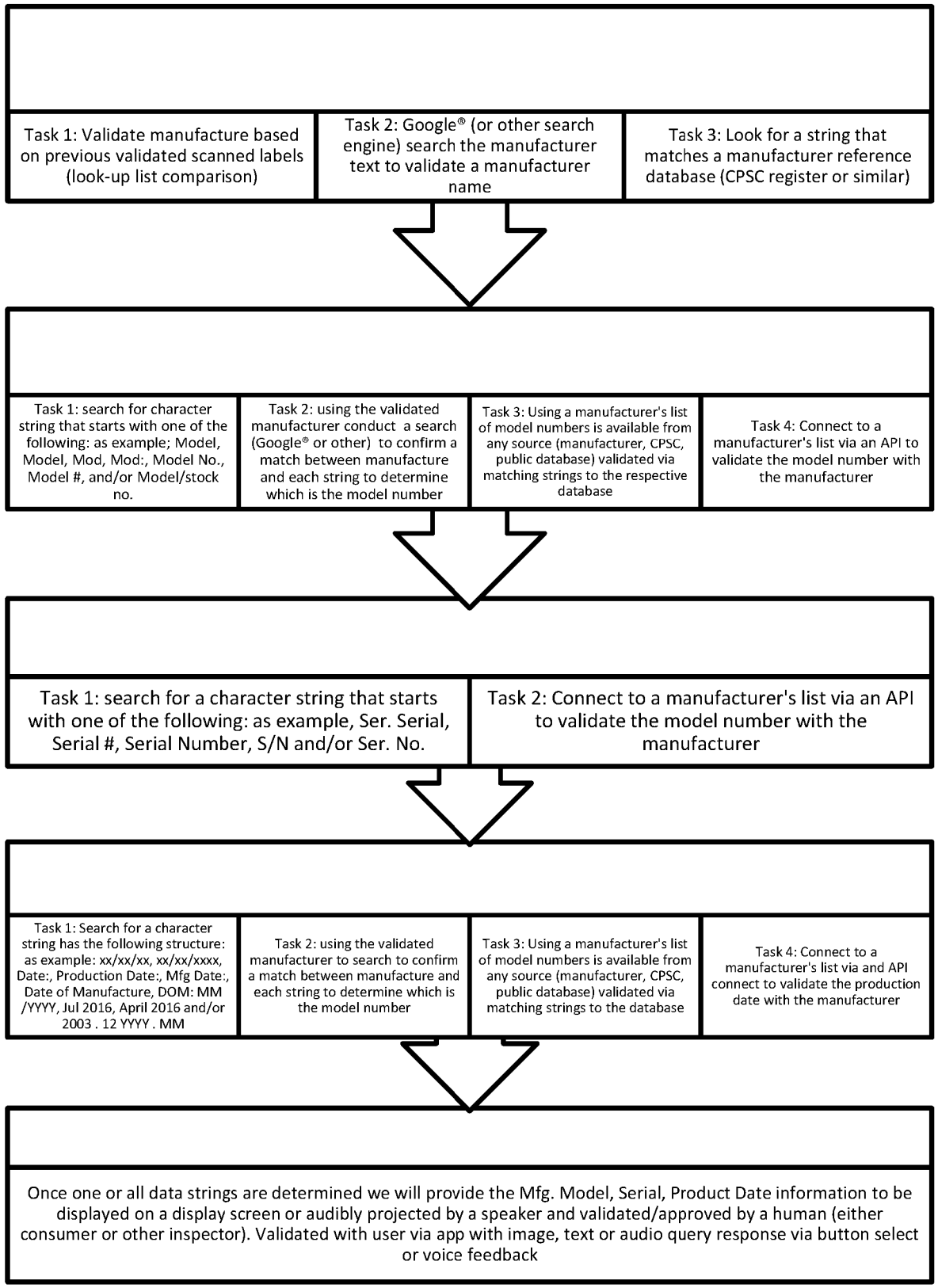
FIG. 4 illustrates a flow chart of the post Optimal Character Recognition (OCR) information validation process according to one or more embodiments shown and described herein.
Figure 5:
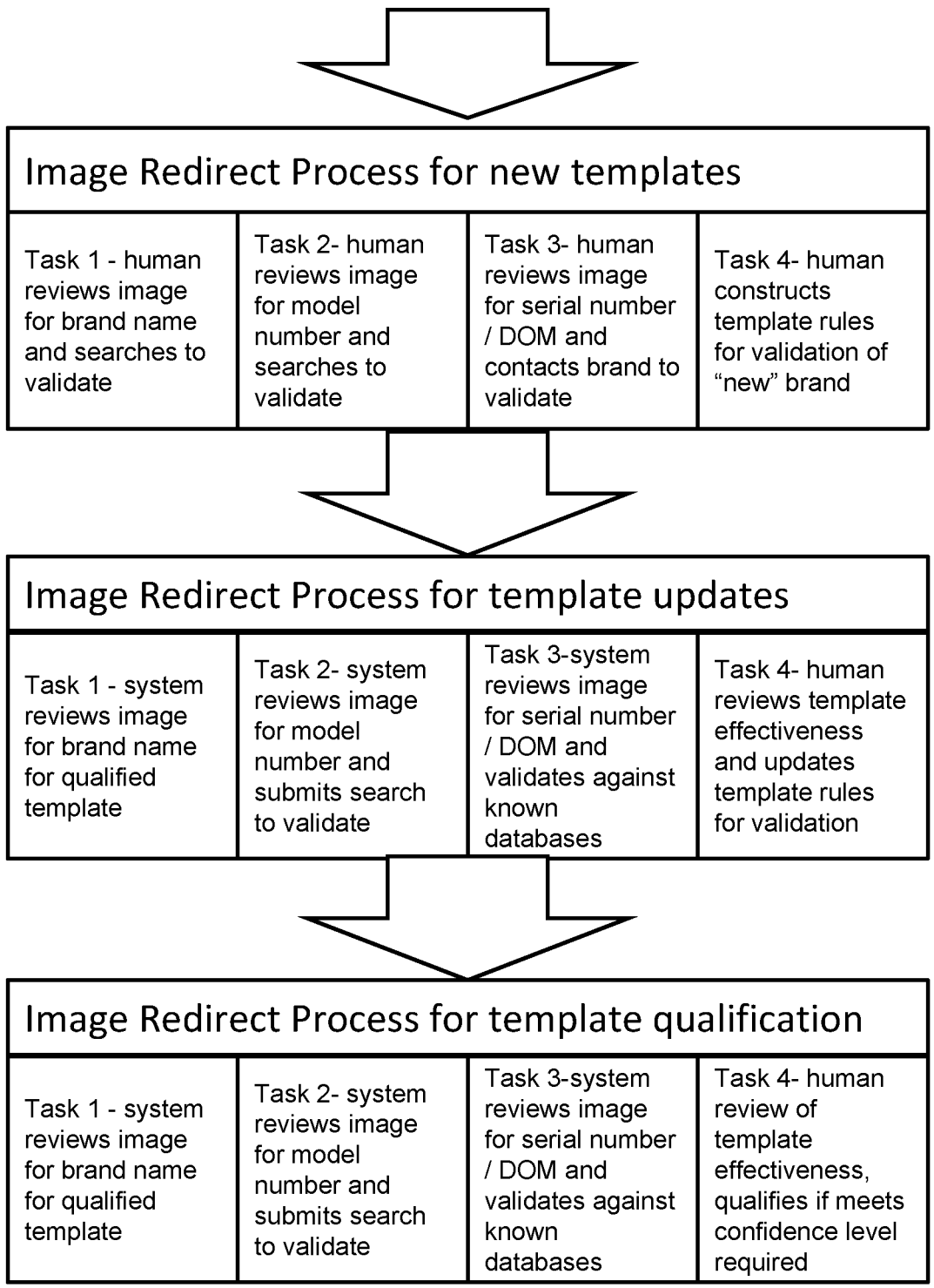
FIG. 5 illustrates a flow chart of the new validation template construction process according to one or more embodiments shown and described herein.

FIG. 4 is a flow chart illustration of the post OCR validation process. During the post OCR validation process the image and extracted text is then downloaded for text mining by the application. FIG. 4 illustrates a stepwise process with rules at each step for determining 1) brand or manufacturer name; 2) model number; 3) serial number and/or date of production. The data is then validated by one or more methods: 1) comparison of data strings with a manufacturer's listed data via an API or like database; 2) Internet search with brand and model number string—perfect match for brand name and model number is validation of brand and model number; 3) echoed back to user on app screen analyzed image and pertinent text information with or without voice for user validation; and/or 4) app may also query users as the brand and product type prior to upload for grid mask.

FIG. 4 validation process generally includes the steps of validating manufacturer information, validating model number information, validating serial number, validating production date, and human validation. Validating manufacturer information determined by OCR from the captured image generally includes the sub steps of: 1) validate manufacture based on previous validated scanned labels (look-up list comparison); 2) Google® (or other search engine) search the manufacturer text to validate a manufacturer name; and/or 3) search for a string that matches a manufacturer reference database such as "CPSC" register or similar.

Validating the model number determined by OCR generally includes the sub steps of: 1) searching for a character string that starts with one of the following: Model, Model, Mod, Mod:, Model No., Model #, and/or Model/stock no. (or any similar variation thereof); 2) using the validated manufacturer conduct a search (Google® or other) to confirm a match between manufacture and each string to determine which is the model number (send out to manufacturer the name and multiple possible.model numbers wherein the number is deemed validated if echoed back); 3) using a manufacturer's list of model numbers that is available from any source (manufacturer, CPSC, public database) validated via matching strings to the respective database (send out to manufacturer the name and multiple possible model numbers wherein the number validated if echoed back) and/or 4) connecting to a manufacturer's list via an API to validate the model number with the manufacturer (direct confirmation of an existing model number). Further, the system may learn from previously validated data used to populate the string of "model" text variations to achieve a more robust system in the long term. Further, it should be appreciated that the "model" characters may be adjacent to the string, below, above, trailing or preceding. The model number characters may also be located adjacent (or near) the bar code.

Validating the serial number determined by OCR generally includes the sub steps of: 1) searching for a character string that starts with one of the following: Ser. Serial, Serial #, Serial Number, S/N and/or Ser. No. (or similar variations thereof); and/or 2) connecting to a manufacturer's list via an API to validate the model number with the manufacturer (direct confirmation of an existing model number). In some embodiments, learning is achieved from previously validated data used to populate this string list of "serial" text variations. Further, it should be appreciated that the "serial number" characters may be adjacent to the string, below, above, trailing or preceding. The serial number characters may also be located adjacent (or near) the bar code.

Validating the production date determined by OCR generally includes the sub steps of: 1) searching for a character string that has the following structure: xx/xx/xx, xx/xx/xxxx, Date:, Production Date:, Mfg Date:, Date of Manufacture, DOM: MINI/YYYY, July 2016, April 2016 and/or 2003. 12 YYYY. MM; 2) using the validated manufacturer to search to confirm a match between manufacture and each string to determine which is the model number; 3) using a manufacturer's list of model numbers is available from any source (manufacturer, CPSC, public database) validated via matching strings to the database; and/or 4) connecting to a manufacturer's list via and API connect to validate the production date with the manufacturer. Learning may also be achieved from previously validated data used to populate the string list of "production date" text variations.

Lastly, a human validation step is required. Once one or all data strings are determined we will provide the Mfg. model number, Serial, Product Date information to be displayed on a display screen or audibly projected by a speaker and validated/approved by a human (either consumer or other inspector). Validated by the user via app with image, text or audio query response. Wherein the response is achieved by the user through a button select or voice feedback.

If in the validation process no reference for a brand name is found then the product label image may be directed to a review process typically involving human review for inspection of the image, manual search and validation of the brand name and model number and then human input of the serial number or date of production information. This would also entail the building of a new template associated with the newly found brand name. As further instances of this brand name are found a number of redirections to the review process for first automated then human reviewer validation. This would continue until a confidence level is reached that the automated process of validation is sufficient. Likewise, if a brand name template is not effective due to a new product type or update in the product label then the human review would provide an additional template that can be used for validation of predetermined product information for a given brand name. It is anticipated that the human review process can eventually be reduced to a rule set and thus part of the automated learning of the validation system.

Once the relevant product information is extracted and validated, the product registration system 10 will interface with the product manufacturer to register the product 30. The system 10 may hold the product registration data in a database which can be connected with other valuable sources such as manufacturers, retailers, consumer product safety organizations, research companies looking for specific product owners, and the like. This may be done through any available means, such as accessing manufacturer websites, direct communication with the manufacturer, other means of communication with the manufacturer.

Once the product is registered with the manufacturer, the manufacturer may provide information on the product to the product registration system 32. For example, the manufacturer may provide the system 10 with information related to product warranties, part or product recalls, maintenance schedules, service manuals, and other content related to the unique product that was registered by the user such as accessories, extended warranties, service parts, or other quality or performance enhancements that are known by the manufacturer and can be addressed. The user may access the product content by logging into their account on the product registration system 10. Any product that has been registered can be deleted by the owner if sold or disposed of. Ownership can be transferred to a new owner as well.

In an embodiment, the user may elect to receive direct communication from a product manufacturer through the software application. The communication may be in the form of alerts, messages, advertising, or the like. The communication may allow the product manufacturer to notify the user regarding recalls, warranty changes or updates, service offers, or related product offers or sales. The software application may further provide the account user with direct assistance from the manufacturer related to the product, such as direct access to a call center or online chatting with technical assistance to resolve issues with the product. The application may further allow the manufacturer to provide the user with content related to the product, such as directions and ideas for using the product.

In an embodiment, the product registration system 10 may generate a set of user tools to allow users to manage maintenance tasks that are suggested by the manufacturers of their registered products. The system 10 may aggregate all maintenance tasks that are recommended by manufacturers of the user's products into a single calendar. The system 10 may further provide easy access to recommended maintenance accessories, such as replacement parts like water filters for a refrigerator. When a user's registered product is reaching the end of a predetermined term, such as the life expectancy of the product or maintenance product, the system may generate special offers from a manufacturer to replace the old product or part with a new one.

The product registration system 10 provides numerous new and novel advantages over prior systems. First, the product registration system 10 creates a unique and centralized location for a user to register, store and access all product registrations. Second, the product registration system 10 provides a simple and hassle-free tool for users to register their products. Third, the product registration system allows manufacturers to both increase the number of product registrations they receive, while also greatly increasing their contact and communication with consumers who purchase their products. The system further provides a valuable solution for product owners to manage and care for products that they have previously purchased, not just newly purchased products. The system provides the unique advantage of allowing users to quickly and easily catalog all consumer products in their home (regardless of brand, production date . . . etc.) allowing users to receive feedback relating to recalls, suggested maintenance, and other product information for their specific products.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

Having thus described the invention, I claim:

1. A method of populating a consumer product database based on information from a product label on a consumer product for generating recall notifications displayed to a user, the method comprising the steps of:

capturing an image of the product label using a camera of a mobile device, wherein capturing the image includes setting a color contrast ratio to compute the difference in luminance between two neighboring colors when shown on display, and wherein capturing the image includes removing gestures and automatically focusing on the product label;

using image recognition on the mobile device to obtain a set of predetermined information from the product label of the consumer product, the predetermined information including the 1) name, 2) model number, and 3) serial number and/or production date;

displaying on a display screen the predetermined information to the user for confirmation of accuracy, receiving input from the user regarding said accuracy of the predetermined information;

comparing the predetermined information to a preexisting database of manufacturers, retailers, and/or consumer product safety organizations to identify potential recalls;

if a recall is identified, displaying the recall information to the user on the mobile device; and storing the predetermined information in the consumer product database.

2. The method of populating a consumer product database of claim 1 wherein, capturing the image of the product label further includes the step of automatically setting grid lines to highlight areas of interest and reduce raw text.

3. The method of populating a consumer product database of claim 1 wherein a plurality of images are taken.

4. The method of populating a consumer product database of claim 1 further comprising the step of audibly projecting through a speaker the predetermined information to the user for confirmation of accuracy, receiving input from the user regarding said accuracy of the predetermined information.

5. The method of populating a consumer product database of claim 1 further comprising the step of displaying predetermined information for human review of images and manual searching regarding said accuracy of the predetermined information and updating of template masks for known manufacturers and constructing grids for previously unknown manufacturers.

* * * * *